United States Patent [19]

Delbouille et al.

[11] 4,262,105

[45] Apr. 14, 1981

[54] PROCESS FOR THE POLYMERIZATION OF OLEFINS AND CATALYTIC PRODUCTS

[75] Inventors: Andre Delbouille; Jean-Louis Derroitte, both of Brussels, Belgium

[73] Assignee: Solvay & Cie, Brussels, Belgium

[21] Appl. No.: 106,732

[22] Filed: Dec. 26, 1979

Related U.S. Application Data

[63] Continuation of Ser. No. 681,559, Apr. 29, 1976, abandoned, which is a continuation of Ser. No. 189,796, Oct. 15, 1971, abandoned.

[30] Foreign Application Priority Data

Oct. 20, 1970 [LU] Luxembourg .......................... 61899

[51] Int. Cl.$^3$ .......................... C08F 4/02; C08F 10/02
[52] U.S. Cl. .............................. 526/124; 252/429 B; 252/429 C; 252/430; 252/431 R; 526/97; 526/114; 526/115; 526/121; 526/125; 526/352
[58] Field of Search ............... 252/429 B, 429 C, 430, 252/431 R; 526/124, 125

[56] References Cited

U.S. PATENT DOCUMENTS

| 3,644,318 | 2/1972 | Diedrich et al. ...................... 526/124 |
| 3,803,105 | 4/1974 | Galli et al. ........................... 526/125 |

FOREIGN PATENT DOCUMENTS

| 1958488 | 5/1970 | Fed. Rep. of Germany . |
| 2000586 | 7/1970 | Fed. Rep. of Germany . |
| 75394 | 8/1970 | German Democratic Rep. . |
| 7000094 | 7/1970 | Netherlands . |
| 1140649 | 1/1969 | United Kingdom . |

OTHER PUBLICATIONS

Ketov et al., Chemical Abstracts, vol. 60, col. 11601h (1964).
Khristov et al., Chemical Abstracts, vol. 61, col. 9161c (1964).
Svit et al., Chemical Abstracts, vol. 65, col. 78a (1966).

*Primary Examiner*—Edward J. Smith
*Attorney, Agent, or Firm*—Pennie & Edmonds

[57] ABSTRACT

This invention relates to the polymerization of α-olefins and to catalysts and cocatalysts for that purpose wherein the polymerization is carried out in the presence of a catalyst comprising an organometallic compound of a metal of Groups IA, IIA, IIB, IIIA, and IVA of the Periodic Table and a cocatalyst comprising the reaction product of a derivative of a transition metal of Groups IVB, VB, and VIB of the Periodic Table and a fluorinated reaction product having an atomic ratio of fluorine/divalent metal greater than 1, said fluorinated reaction product being formed by reacting a fluorinating agent with an oxygenated compound of a divalent metal at a temperature between about 150° to 450° C. for a time sufficient to form said reaction product. The invention also comprises the method of making the cocatalysts.

16 Claims, No Drawings

PROCESS FOR THE POLYMERIZATION OF OLEFINS AND CATALYTIC PRODUCTS

This is a continuation of application Ser. No. 681,559, filed Apr. 29, 1976, now abandoned, which is a continuation of Ser. No. 189,796, filed Oct. 15, 1971, now abandoned.

BACKGROUND OF THE INVENTION

In French Pat. No. 1,582,543 July 1, 1968, there are described polymerization catalysts for olefins comprising a catalytic solid obtained by reacting a halogenating agent and a derivative of a transition metal with a solid support consisting of an oxygenated compound of a divalent metal. The conditions of the reaction of the solid support with the halogenating agent are selected so as to fix a quantity of halogen so that the atomic ratio of halogen/divalent metal is less than 1. The temperature at which this reaction is carried out is between 20 and 250° C. and preferably between 60 and 150° C. The polymers obtained by means of these catalysts are characterized by a relatively low mean molecular weight and are used principally in applications where molding is carried out by injection. However, they are not entirely suitable for applications where the molding is carried out by extrusion or by blowing.

SUMMARY OF THE INVENTION

It has now been found that it is possible to prepare catalysts which can be used to prepare polymers with a high mean molecular weight and which are easy to use in extrusion and blow molding. These catalysts are distinguished from those described above in that they are fluorinated, that the atomic ratio of fluorine/divalent metal must be greater than 1 and that the reaction with the fluorinating agent is carried out at a temperature higher than 150° C.

The present invention comprises a process for the polymerization and copolymerization of α-olefins, particularly ethylene, in which one operates in the presence of a catalyst comprising an organometallic compound of a metal of Groups IA, IIA, IIB, IIIA and IVA of the Periodic Tables and a cocatalyst obtained by reacting an oxygenated compound of a divalent metal with a fluorinating agent and a derivative of a metal of Groups IVB, VB and VIB of the Periodic Table, in which the reaction between the oxygenated compound of a divalent metal and the fluorinating agent is carried out at a temperature between 150° and 450° C. and in which the atomic ratio of fluorine/divalent metal of the product of the reaction between the oxygenated compound of a divalent metal and the fluorinating agent is greater than 1. The invention also comprises the catalytic products and methods of making them as hereinafter described.

DETAILED DESCRIPTION

As used herein, the term "oxygenated compound" is meant to designate any compound of any divalent metal which has divalent metal/oxygen bonds in its molecule. However, it is preferred to use a divalent metal from the group consisting of magnesium, calcium, zinc, manganese, iron, nickel, cobalt and tin, with the best results being obtained with the magnesium compounds.

Among the oxygenated compounds, the preferred groups and specific examples are:
the oxides: $MgO$, $CaO$ or $ZnO$ and the like;
the hydroxides: $Mg(OH)_2$ or $Ca(OH)_2$ and the like;
the hydroxycarbonates: $3MgCO_3 \cdot Mg(OH)_2 \cdot 3H_2O$ and the like;
the salts of inorganic acids: $MgSO_4$, $Mg(NO_3)_2$, $Mg_3(PO_4)_2$, $MgSiO_4$ or $MgCO_3$ and the like;
the alkoxides whose radicals contain from 1 to 20 preferably 1 to 10 carbon atoms each: $Mg(OC_2H_5)_2$, $Mg(OC_4H_9)_2$, $Mg(OC_8H_{17})_2$ or $Mg(OC_{16}H_{33})_2$ and the like;
the phenates whose radicals contain 1 to 20 and preferably 1 to 10 carbon atoms each: $Mg(OC_6H_5)_2$ and the like; and
the salts of organic acids derived from acids containing 1 to 20 and preferably 1 to 10 carbon atoms in the molecule: $Mg(OOCCH_3)_2$, $Mg(OOCC_3H_7)_2$ or $Mg(OOCC_6H_5)_2$ and the like.

One may also use the oxygenated compounds of divalent metals containing other radicals attached to the metal than oxygen or those which are connected via the oxygen. Among these other radicals one may mention the halide radicals. However, it is preferable to use the oxygenated compounds containing at least one divalent metal/oxygen bond per atom of divalent metal. By way of examples of this type of compound one may mention $Mg(OH)Cl$ and $Mg(OH)Br$.

These oxygenated compounds are generally solid and their particle size is not critical. For reasons of convenience, however, it is preferred to use them in the form of particles whose mean diameter is between 1 and 500 microns and preferably between 40 and 200 microns.

All the known fluorinating agents may be used within the framework of the present invention. Among those most frequently employed one may mention:
hydrogen fluoride;
the fluorides of metals and ammonium: $KF$, $KF \cdot HF$, $NH_4F$ and $NH_4F \cdot HF$ and the like; and
complex fluorides of metals and ammonium: $Na_2SiF_6$ and $(NH_4)_2SiF_6$ and the like.

The reaction between the oxygenated compound and the fluorinating agent is carried out preferably before the reaction with the derivative of a metal of Groups IVB, VB and VIB of the Periodic Table. It may be carried out by any process which is compatible with the properties of the fluorinating agent used. One may thus use the fluorinating agent:
in a gaseous or vapor state, either pure or mixed with an inert gas;
in the liquid state, either pure or diluted with an inert liquid;
in the dissolved state; or
in the solid state, by solid/solid reaction or by the evolution of a volatile fluorinated compound.

The temperature at which the reaction is carried out must be above about 150° C. A temperature between about 150° and 450° C. and preferably between 200 and 400° C. can be used with the best results being obtained between 250 and 300° C. When the reaction is carried out at lower or higher temperatures, the catalytic systems obtained are less active.

The other conditions of the reaction are selected so as to obtain a product, which is also solid, in which the concentrations of divalent metal and fluorine are such that the atomic ratio of fluorine to divalent metal is greater than 1 and preferably greater than 1.3. The best results are obtained when this ratio is greater than 1.6. In certain cases it is even greater than 2. While the precise theory is not completely understood, various explanations may be put forward for this phenomenon. It is believed, in particular, that certain reagents used during the course of the preparation of the cocatalyst or certain byproducts are also fixed chemically and that the cocatalyst contains fluorine which is not directly attached to the divalent metal. Besides the fluorine and the divalent metal, the product also contains other elements but in less considerable proportions.

The duration of the reaction is generally between 10 minutes and 24 hours. The total quantity of fluorinating agent used is at least equal to that which is stoichiometrically necessary to arrive at the desired ratio of fluorine/divalent metal. The concentration is also determined on the basis of other conditions of the reaction and the desired ratio.

The fluorinated complex which is produced by the reaction is solid. It is generally separated from the reagents which have not been consumed and preferably dried, for example, in vacuo. It may also be subjected to a treatment of activation by heating to a temperature which is also between 150 and 450° C. and is preferably between 200° and 350° C. The duration of this treatment may vary between 1 and 24 hours. The treatment may also be carried out under reduced pressure.

After the reaction of the oxygenated compound of the divalent metal with the fluorinating agent, the solid fluorinated complex is made to react with a derivative of a transition metal of groups IVB, VB and VIB of the Periodic Table so as to form the cocatalyst. The derivative is preferably selected from among the compounds of titanium, zirconium, vanadium and chromium. The best results are obtained with derivatives of titanium.

As derivative one may use the halides, oxyhalides, alkoxyhalides, oxyalkoxyhalides, oxyalkoxides and alkoxides. When one uses halogenated compounds it is preferable to use brominated and chlorinated derivatives. When one uses compounds containing alkoxide radicals, they are preferably chosen from among those whose alkoxide radicals, whether straight or branched, contain from 1 to 20 carbon atoms and more particularly from 1 to 10 carbon atoms. Examples of compounds which can be used are: $TiCl_4$, $TiBr_4$, $VCl_4$, $VOCl_3$, $VOBr_3$, $CrO_2Cl_2$, $Ti(OC_2H_5)_3Cl$, $Ti(OiC_3H_7)_3Cl$, $Ti(OC_2H_5)_2Cl_2$, $Ti(OiC_3H_7)Cl_3$, $VO(OiC_3H_7)_3$ and $Ti(OiC_4H_9)_4$. The best results are obtained with $TiCl_4$.

The reaction with the derivative may be carried out by any process which is compatible with the physical form of the reagents. The derivative may be used in the form of gas or vapor, possibly diluted with an inert gas, in the liquid form or in the form of a solution. As solvent one generally uses an inert hydrocarbon solvent such as butane, pentane, hexane, heptane, cyclohexane, methylcyclohexane or mixtures thereof. A particularly convenient method of procedure consists in bringing the solid fluorinated complex into suspension in the pure derivative, brought and maintained in the liquid state. One may also carry out the reaction by washing the solid fluorinated complex with the derivative when the latter is liquid under the reaction conditions.

The temperature and the pressure at which the reaction is carried out are not critical. Generally speaking one operates for reasons of convenience at atmospheric pressure and at temperatures between 0° and 300° C. and preferably between 20° and 150° C. A particularly convenient technique consists in operating in the derivative maintained at boiling point.

The reagents are maintained in the presence of one another for a period which is sufficient for there to take place a chemical fixation of the derivative of metals of groups IVB, VB, and VIB of the Periodic Table. Generally speaking this fixation has occurred after about one hour.

After the reaction, the cocatalyst, which is also solid, is collected separately. If desired it may be subjected to a treatment of extraction with the derivative used for the reaction. After this it is generally washed with an inert hydrocarbon solvent such as butane, pentane, hexane, heptane, cyclohexane, methylcyclohexane or mixtures thereof. This washing makes it possible to eliminate the excess of reagents and the by products of the reaction which are simply adsorbed onto the surface of the cocatalyst.

When one carries out the elementary analysis of the cocatalyst after washing it is found that it contains a certain quantity of metal of Groups IVB, VB and VIB. This quantity is greater than 0.1 mg/g and generally than 1 mg/g. This shows that there has in fact been a chemical fixing of the derivative.

The cocatalyst also contains other elements coming from the reagents and notably divalent metal and fluorine. Generally speaking the atomic ratio of fluorine to divalent metal is greater than 1 and even greater than 1.3. It is greater than 1.6 for the most active cocatalysts.

The catalyst according to the present invention also comprises an organometallic compound of a metal of groups IA, IIA, IIB, IIIA and IVA of the Periodic Table, such as the organic compounds of lithium, magnesium, zinc, aluminum or tin. The best results are obtained with alkyl aluminums. Examples of suitable organometallic compounds are:

A. Completely alkylated compounds whose alkyl chains generally contain from 1 to 20 and preferably from 1 to 10 carbon atoms and are straight or branched, such as for example n-butyl lithium, diethyl magnesium diethyl zinc, trimethyl aluminum, triethyl aluminum, tri-isobutyl aluminum, trioctyl aluminum, tridecyl aluminum and tetrabutyl tin.

B. Alkyl aluminum hydrides in which the alkyl radicals also contain from 1 to 20 and preferably 1 to 10 carbon atoms, such as diisobutyl aluminum hydride and trimethyl tin hydride. Also suitable are the alkyl halides of metals in which the alkyl radicals also contain from 1 to 20 and preferably 1 to 10 carbon atoms such as ethyl aluminum sesquichloride, diethyl aluminum chloride and diisobutyl aluminum chloride.

C. Organoaluminum compounds obtained by reacting trialkyl aluminums or dialkyl aluminum hydrides whose radicals contain from 1 to 20 carbon atoms with diolefins containing 4 to 20 carbon atoms. Among these compounds are those which are known generally as isoprenyl aluminums.

The process of the invention is applied to the polymerization of olefins, such as α-olefins, with a terminal unsaturation, whose molecules contain from 2 to 18 and preferably 2 to 6 carbon atoms, such as ethylene, propylene, butene-1, 4-methylpentene-1 and hexene-1. It is also applicable to the copolymerization of these olefins with one another and also with diolefins preferably containing from 4 to 18 carbon atoms. These diolefins may be unconjugated aliphatic diolefins such as hexadiene-1,4, unconjugated monocyclic diolefins suh as 4-vinylcyclohexane, 1,3-divinylcyclohexane, cycloheptadiene-1,4 or cyclo-octadiene-1,5, alicyclic diolefins with an endocyclic bridge such as dicyclopentadiene or norbornadiene and conjugated aliphatic diolefins such as butadiene and isoprene.

The process of the invention is especially useful in the manufacture of homopolymers of ethylene and copolymers containing at least 90 moles percent and preferably 95 moles percent of ethylene. As used herein, the phrase "polymerization and copolymerization of α-olefins" is intended to include copolymerization of various α-olefins with each other and with diolefins.

The polymerization may be carried out by any known process; in solution or in suspension in a solvent or hydrocarbon diluent or again in the gaseous phase. For processes in solution or in suspension one uses inert hydrocarbon solvents or diluents analogous to those used for the washing of the catalytic element: these are preferably aliphatic or cycloaliphatic hydrocarbons such as butane, pentane, hexane, heptane, cyclohexane, methylcyclohexane or mixtures thereof. One may also carry out the polymerization in the monomer or one of the monomers maintained in the liquid state.

The polymerization pressure is generally between atmospheric pressure and 100 kg/cm$^2$, preferably 5 to 50 kg/cm$^2$. The temperature is generally maintained between 20° and 120° C. and preferably between 60° and 100° C. The polymerization may be carried out continuously or discontinuously.

The organometallic compound and the cocatalyst may be added separately to the polymerization medium. One may also bring them into contact at a temperature of between −40° and 80° C. for a period which may range up to 2 hours before introducing them into the polymerization reactor. One may also bring them into contact in a number of stages or again one may add only a part of the organometallic compound before the reactor or again one may add several different organometallic compounds.

The total quantity of organometallic compound used is not critical; it is generally between 0.02 and 50 mmoles per dm$^3$ of solvent, diluent or reactor volume and preferably between 0.2 and 5 mmoles/dm$^3$.

The quantity of cocatalyst used is determined according to the content of metal of groups IVB, VB and VIB of the element. It is usually chosen so that the concentration is between 0.001 and 2.5 and preferably between 0.01 and 0.25 milligram atoms of metal per dm$^3$ of solvent, diluent or reactor volume.

The ratio of the quantities of organometallic compound and catalytic element is not critical either. It is generally chosen so that the ratio of organometallic compound to metal of groups IVB, VB and VIB expressed in moles per gram atom is greater than 1 and preferably greater than 10.

The mean molecular weight of the polymers manufactured according to the process of the invention may be regulated by the addition to the polymerization medium of one or more molecular weight modifying agents such as hydrogen, diethyl zinc or diethyl cadmium, alcohols or carbon dioxide.

The specific weight of the homopolymers manufactured according to the process of the invention may also be regulated by the addition to the polymerization medium of an alkoxide of a metal of Groups IVB and VB of the Periodic Table. In this way it is possible to manufacture polyethylenes with a specific gravity intermediate between those of the polyethylene manufactured by a high-pressure process and those of the classic high-density polyethylenes.

Among the alkoxides which are suitable for this regulation, those of titanium and vanadium whose radicals contain 1 to 20 carbon atoms each one particularly useful. One may mention among them Ti(OCH$_3$)$_4$, Ti(OC$_2$H$_5$)$_4$, and Ti(OC$_{16}$H$_{33}$)$_4$.

The process of the invention makes it possible to manufacture polyolefins with remarkably high productivities. Thus in the homopolymerization of ethylene, the productivity expressed in g of polyethylene per g of cocatalyst exceeds 500 and frequently even 1500. Furthermore, the content of metal of groups IVB, VB and VIB of the cocatalyst is relatively low. For this reason the quantity of these metals present in the state of catalytic residue in the polymer is also very low, more often than not less than 20 ppm. Consequently the polymer does not have to be purified before it is used, which constitutes a very appreciable advantage because the purification is the most costly and the trickiest operation in the finishing of polymers.

Furthermore, the polyolefins obtained by the process of the invention are noteworthy because of their physical properties. In particular, the polyethylenes are characterized by a particularly high mean molecular weight and consequently a very low melt index. Even when one carries out the polymerization at elevated temperature and uses a high concentration of molecular weight depressing agent, one obtains polyethylenes with a melt index (under 2.16 kg) of less than 1 and a melt index under heavy load (21.6 kg) of less than 5. Furthermore the polyolefins manufactured by the process of the invention are characterized by a very close distribution of molecular weights even when one carries out the polymerization in the presence of a high concentration of hydrogen, and although the latter has the effect of widening the distribution of molecular weights. Thus one easily obtains polyethylenes with a metal index of less than 1, characterized by a $C_d$ factor of less than 7. The $C_d$ factor is defined in French Pat. No. 1,582,942 dated Aug. 26, 1968, and serves to characterize the distribution of molecular weights. The smaller it is, the narrower the distribution.

The polyolefins possessing these properties are particularly interesting for applications where the processing is carried out by extrusion or blow molding. They make it possible to use particularly high extrusion speeds without the phenomenon of melt fracture occurring, despite their narrow distribution range of molecular weights.

The invention will be further described in connection with the following examples which are set forth for purposes of illustration only and are not to be construed as limiting the scope thereof in any manner.

EXAMPLE 1

40 g of hydromagnesite (3MgCO$_3$. Mg(OH)$_2$.3H$_2$O) are carefully mixed with 60 g of ammonium fluoride (NH$_4$F) and introduced into an approximately one-liter quartz reactor. The reactor is brought to 290° C. and there is introduced into the bottom thereof a stream of nitrogen which is sufficient to bring the solid products in the reactor into a state of suspension. The temperature is maintained constant for 15 hours; after which the reaction is stopped.

The fluorinated complex produced by the reaction of the hydromagnesite with the ammonium fluoride contains 612 mg/g of fluorine and 353 mg/g of magnesium. The atomic ratio F/Mg is therefore 2.2.

The reaction product is introduced into a 500-ml. glass reactor to which is added 200 ml. of TiCl$_4$. The temperature is brought to approximately 130° C. and it is then heated under a reflux for 1 hour. The cocatalyst formed, which is solid, is separated. It is washed with dry hexane until all trace of chlorinated product in the washing solvents disappears. It is then dried in vacuo.

The cocatalyst contains 585 mg/g of fluorine, 361 mg/g of magnesium, 27 mg/g of chlorine and 13 mg/g of titanium.

In a 1.5-liter stainless steel polymerization reactor there is placed 0.5 liters of hexane, 68 mg of cocatalyst and 200 mg of tri-isobutyl aluminum in the form of a 10% solution in hexane. The temperature of the reactor is then brought to 85° C. and ethylene introduced under a partial pressure of 10 kg/cm$^2$ and hydrogen also under a pressure of 10 kg/cm$^2$. The total pressure is maintained constant by the continuous addition of ethylene. The temperature is also maintained constant.

After one hour one stops the polymerization. The reactor is degassed and the polymer is recovered and dried.

110 g of polyethylene are obtained. The hourly productivity is therefore 1620 g polyethylene/g cocatalyst. The specific activity based on one hour, reckoned on the weight of titanium used and at 1 kg/cm$^2$ of ethylene is 12,500 g polyethylene/hr.g.Ti.kg/cm$^2$C$_2$H$_4$.

The polyethylene obtained is characterized by a melt index of 0.14 g/10 mins. (measured in accordance with ASTM Standard D 1238-57 T -load 2.16 kg), a C$_d$ factor of less than 6 (measured in accordance with the method described in French Pat. No. 1,582,942) and a ratio as between the average molecular weight in weight and the average molecular weight in number being 2.8. It therefore possesses both a very low melt-index and a very narrow distribution of molecular weights.

EXAMPLE 2

This example is given by way of comparison. Instead of using a cocatalyst in accordance with the invention, there is used a cocatalyst prepared by reacting a magnesium fluoride (a product of BDH) with titanium tetrachloride under conditions identical to those of Example 1.

The cocatalyst obtained contains 0.75 mg/g of titanium.

The polymerization is carried out as in Example 1, except that there is used 2.863 gms. of cocatalyst and 1.0 gms. of triisobutyl aluminum and one operates under a mean ethylene pressure of 13.8 kg/cm$^2$.

137 g of polymer are obtained. The hourly productivity is 36 g polyethylene/g cocatalyst and the specific activity is 4700 g polyethylene/hr.g.Ti.kg/cm$^2$C$_2$H$_4$.

This test shows that when one uses magnesium fluoride instead of the fluorinated complex according to the invention, one obtains far less active cocatalysts; the hourly productivity is no longer more than 2% of the reference and the specific activity is reduced by more than 60%.

EXAMPLES 3 to 5

These tests are carried out under the same conditions as Example 1 except as regards the particular conditions set out in Table I below. In the case of Example 5, the partial pressure of hydrogen is 4 kg/cm$^2$ instead of 10 kg/cm$^2$.

TABLE I

|  | Ex. 3 | Ex. 4 | Ex. 5 |
|---|---|---|---|
| Temperature at which the reaction of 3MgCO$_3$ . Mg(OH)$_2$ . 3H$_2$O with NH$_4$F takes place °C. | 160 | 400 | 560 |

TABLE I-continued

|  | Ex. 3 | Ex. 4 | Ex. 5 |
|---|---|---|---|
| F content of the fluorinated complex, mg/g | 547 | 477 | 602 |
| Mg content of the fluorinated complex, mg/g | 290 | 358 | 345 |
| Atomic ratio F/Mg of the fluorinated complex | 2.41 | 1.70 | 2.23 |
| F content of the cocatalyst, mg/g | 410 | 543 | 599 |
| Mg content of the cocatalyst, mg/g | 225 | 345 | 339 |
| Ti content of the cocatalyst, mg/g | 53 | 7.2 | 3.1 |
| Cl content of the cocatalyst, mg/g | 165 | 19 | 6.2 |
| Quantity of cocatalyst used, mg | 72 | 69 | 68 |
| Weight of polyethylene obtained, g | 5 | 8 3 | 20 |
| Hourly productivity, g polyethylene/g cocatalyst | 70 | 1 200 | 290 |
| Specific activity, g polyethylene/h.g Ti . kg/cm$^2$ C$_2$H$_4$ | 1800 | 16 700 | 9500 |
| Melt index of the polyethylene, g/10 mins (load 2.16 kg) | 0.09 | 0.05 | 0.25* |

*Melt index measured under a heavy load (21.6 kg).

These tests should be compared with that of Example 1. The results shown in Table I show that the temperature at which the reaction between the oxygenated compound and the fluorinating agent takes place exerts a predominant influence on the performances of the cocatalyst. This influence is also shown by the examples which follow.

EXAMPLES 6 to 9

Those experiments were carried out under the same conditions as in Example 1 except that magnesium ethylate Mg(OC$_2$H$_5$)$_2$ is used in place of hydromagnesite and that the partial hydrogen pressure is 4 kg/cm$^2$. These particular data of the tests are set out in Table II below.

TABLE II

|  | Ex. 6 | Ex. 7 | Ex. 8 | Ex. 9 |
|---|---|---|---|---|
| Temperature at which the reaction of Mg(OC$_2$H$_5$)$_2$ with NH$_4$F takes place, °C. | 150 | 250 | 300 | 400 |
| F content of the fluorinated complex, mg/g | 622 | 532 | 607 | 593 |
| Mg content of the fluorinated complex, mg/g | 355 | 373 | 358 | 299 |
| Atomic ratio F/Mg of the fluorinated complex | 2.24 | 1.82 | 2.17 | 2.54 |
| F content of the cocatalyst, mg/g | 480 | 516 | 582 | 578 |
| Mg content of the cocatalyst, mg/g | 316 | 370 | 287 | 260 |
| Cl content of the cocatalyst, mg/g | 28 | 25 | 4.7 | 2.7 |
| Ti content of the cocatalyst, mg/g | 12 | 6.2 | 3.1 | 1.3 |
| Quantity of cocatalyst used, mg | 52 | 53 | 51 | 52 |
| Weight of polyethylene obtained, g | 42 | 38 | 16 | 4 |
| Hourly productivity, g polyethylene/g, cocatalyst | 810 | 720 | 310 | 80 |
| Specific activity g polyethylene/ h.g. Ti . kg/cm$^2$ C$_2$H$_4$ | 6700 | 11 600 | 10 100 | 5900 |
| Melt index of the polyethylene, g/10 mins. (load 2.16 kg) | 0.20* | 0.43* | 0.23 | 0.18 |

*Melt index measured under a heavy load (21.6 kg)

The results of these tests, supplemented by those of tests 1 and 3 to 5, show clearly that the temperature at which the reaction with the halogenating agent is carried out predetermines the performances of the cocatalyst. At low temperature, the hourly productivity is acceptable but the specific activity is low. For this reason the content of derivative of metals of groups IVB, VB and VIB in the polymers is too high and the polymers have to be purified. At high temperature the specific activity becomes low and furthermore the productivity diminishes greatly. Consequently the ash content of the polymers becomes prohibitive.

EXAMPLE 10

30 g of magnesium oxide MgO is introduced into a 1-liter steel reactor. The temperature is brought to 283° C. and there is introduced, through the bottom of the reactor, a gaseous mixture containing 50 moles percent of hydrogen fluoride and 50 moles percent of nitrogen. The rate of gas flow is 45 liters per hour under normal pressure. The temperature is maintained constant and the flushing by means of the gaseous mixture is maintained until the quantity of hydrogen fluoride leaving the reactor is equal to that which goes in.

The fluorinated complex produced from the reaction of MgO with HF contains 596 mg/g of fluorine and 378 mg/g of magnesium. The atomic ratio of F/Mg is therefore 1.81.

The reaction product is introduced into a 500-ml. glass reactor and treated with 200 mls. of $TiCl_4$ as in Example 1.

The cocatalyst thus prepared contains 525 mg/g of fluorine, 359 mg/g of magnesium, 13 mg/g of chlorine and 9.7 mg/g of titanium.

A polymerization test is carried out as in Example 1 except that there is used 39 mg of cocatalyst and the pressure of hydrogen is 8 $kg/cm^2$.

91 g of polymer are obtained. The hourly productivity is 2340 g of polyethylene per g of cocatalyst. The specific activity is 24,000 g of polyethylene/hr.g.Ti.kg/$cm^2C_2H_4$. The melt index of the polyethylene obtained is 0.06 g/10 mins. (load: 2.16 kg.).

EXAMPLE 11

One proceeds as in Example 10 except that there is used 30 g of magnesium ethylate $Mg(OC_2H_5)_2$ in place of the magnesium oxide.

The fluorinated complex produced from the reaction of $Mg(OC_2H_5)_2$ with HF contains 574 mg/g of fluorine and 344 mg/g of magnesium, or an F/Mg ratio of 2.12.

The cocatalyst contains 522 mg/g of fluorine, 320 mg/g of magnesium, 44 mg/g of chlorine and 24 mg/g of titanium.

The polymerization is carried out as in Example 1 except that one uses 51 mg of cocatalyst. One obtains 67 g of polymer. The hourly productivity is 1310 g of polyethylene/g of cocatalyst. The specific activity is 5500 g polyethylene/hr.g.Ti.kg/$cm^2C_2H_4$. The melt index of the polyethylene obtained is 0.14 g/10 mins. (load: 2.16 kg.).

EXAMPLE 12

One proceeds as in Example 11 except that 101 mg of the cocatalyst are used and the organometallic compound is trihexadecyl aluminum. 702 mg of this compound are used. Furthermore, the partial ethylene pressure is 5 $kg/cm^2$ and the hydrogen pressure 7 $kg/cm^2$.

68 g of polymer are obtained. The hourly productivity is 670 g polyethylene/g cocatalyst. The specific activity is 5,600 g polyethylene/hr. g. Ti.kg/$cm^2C_2H_4$. The melt index of the polyethylene obtained is 0.14 g/10 mins. (load: 2.16 kg.).

EXAMPLE 13

One proceeds as in Example 12 except that one use 72 mg of trimethyl aluminum as organometallic compound.

29 g of polymer are obtained. The hourly productivity is 290 g polyethylene/g cocatalyst. The specific activity is 2400 g polyethylene/hr.g.Ti.kg/$cm^2C_2H_4$. The melt index of the polymer obtained is 0.14 g/10 mins. (load: 2.16 kg.).

EXAMPLE 14

45 g of hydromagnesite $3MgCO_3.Mg(OH)_2.3H_2O$ are carefully mixed with 55 g of $NH_4F.HF$ as in Example 1 but at a temperature of 270° C. The fluorinated complex produced from the reaction contains 556 mg/g of fluorine and 356 mg/g of magnesium. The atomic ratio F/Mg is therefore 1. 97.

The cocatalyst is then prepared as in Example 1. It contains 526 mg/g of fluorine, 342 mg/g of magnesium, 34 mg/g of chlorine and 14 mg/g of titanium.

The polymerization is then carried out as in Example 1 but using 62 mg of cocatalyst. 109 g of polyethylene are obtained having a melt index equal to 0.67 g/10 min. The hourly productivity is therefore 1760 g polyethylene/g cocatalyst and the specific activity is 12,550 g polyethylene/hr.g.Ti. kg/$cm^2C_2H_4$.

EXAMPLE 15

Hydromagnesite is admixed with ammonium fluoride in an atomic ratio of F/Mg=2.5 and it is heated to 300° C. for 5 hours in accordance with the mode of operation described in Example 1.

The fluorinated complex thus obtained contains 382 g/kg of mg and 549 g/kg of F. The atomic ratio of F/Mg is therefore 1.84.

This product is impregnated with $VOCl_3$ by extraction for one hour, the solid obtained is separated, washed with hexane and dried as stated in Example 1. Elementary analysis shows that it contains Mg:369 mg/g; Cl:13 mg/g; F:490 mg/g; V:10 mg/g.

102 mg of this cocatalyst are used for a polymerization test carried out in accordance with the mode of operation of Example 1. 12 g of polyethylene are obtained which corresponds to an hourly catalytic productivity of 12 g polyethylene solid atm. $C_2H_4$. The specific activity is 1177 g polyethylene/hr. gV.Kg/$cm^2$ $C_2H_4$. The melt index of the polymer obtained is 0.39 g/10 min (load: 2.16 kg).

It will be understood that it is intended to cover all changes and modification of the disclosure of the invention herein chosen for the purpose of illustration which do not constitute departures from the spirit and scope of the invention.

What is claimed is:

1. Catalyst for the polymerization and copolymerization of α-olefins comprising:
   (a) a tri($C_1$-$C_{20}$alkyl)aluminum compound; and
   (b) a cocatalyst comprising the reaction product of a titanium metal derivative selected from halides, oxyhalides, alkoxyhalides, oxyalkoxyhalides, oxyalkoxides, or alkoxides and a fluorinated reaction complex having an atomic ratio of fluorine/divalent metal from greater than 1 to about 2.5, said fluorinated reaction complex being formed by reacting a fluorinating agent selected from hydrogen fluoride, metal fluorides, or ammonium fluoride with an oxygenated compound of magnesium selected from oxides, hydroxides, hydroxycarbonates, salts of inorganic acids, alkoxides, phenates, enolates, or carboxylates at a temperature of from 200° C. to 400° C. for a time sufficient to form said fluorinated reaction product.

2. The catalyst of claim 1 wherein the titanium metal derivative is titanium tetrachloride.

3. The catalyst of claim 1 wherein the temperature range is between 250° and 300° C.

4. A process for the polymerization and copolymerization of α-olefins which comprises contacting the olefins, at a temperature and at a pressure sufficient to initiate the reaction, with a catalytic amount of the catalyst of claim 1.

5. A process for the polymerization and copolymerization of ethylene which comprises contacting ethylene, at a temperature and at a pressure sufficient to initiate the reaction, with a catalytic amount of the catalyst of claim 1.

6. A process for the polymerization and copolymerization of ethylene which comprises contacting ethylene, at a temperature and at a pressure sufficient to initiate the reaction, with a catalytic amount of the catalyst of claim 2.

7. A cocatalyst for use with a tri($C_1$–$C_{20}$alkyl) aluminum compound to catalyze the polymerization and copolymerization of α-olefins comprising the reaction product of a derivative of titanium metal selected from halides, oxyhalides, alkoxyhalides, oxyalkoxyhalides, oxyalkoxides, or alkoxides and a fluorinated reaction complex having an atomic ratio of fluorine/divalent metal from greater than 1 to about 2.5, said fluorinated reaction complex being formed by reacting a fluorinating agent selected from hydrogen fluoride, metal fluorides, or ammonium fluoride with an oxygenated compound of magnesium selected from oxides, hydroxides, hydroxycarbonates, salts of inorganic acids, alkoxides, phenates, enolates, or carboxylates at a temperature of from 200° C. to 400° C. for a time sufficient to form said fluorinated reaction product.

8. The cocatalyst of claim 7 wherein the titanium derivative is titanium tetrachloride.

9. The cocatalyst of claim 8 wherein the magnesium compound is a magnesium oxide.

10. The cocatalyst of claim 7 wherein the temperature range is between 250° and 300° C.

11. A method for making the cocatalyst of claim 7 comprising the steps of reacting the fluorinating agent with the oxygenated compound of magnesium at a temperature of from 200° C. to 400° C. for a time sufficient to form a solid reaction product having an atomic ratio of fluorine/magnesium from greater than 1 to about 2.5, and reacting said solid fluorinated reaction complex with a titanium metal derivative at a temperature and for a time sufficient to chemically fix the transition metal derivative to the solid reaction complex.

12. The method of claim 11 wherein the reaction between the fluorinating agent and oxygenated compound is carried out at a temperature between 200° C. and 400° C.; the amount of fluorinating agent used is at least equal to that stoichiometrically necessary to obtain a fluorine/magnesium metal atomic ratio from greater than 1 to about 2.5, the reaction between the solid reaction complex and the titanium metal derivative is carried out at a temperature of about 20° to 150° C. and the titanium derivative is titanium tetrachloride.

13. The cocatalyst of claim 8 wherein the magnesium compound is a magnesium hydroxycarbonate.

14. The cocatalyst of claim 8 wherein the magnesium compound is a magnesium alkoxide.

15. The cocatalyst of claim 8 wherein the magnesium compound is a magnesium salt of an organic acid having from 1 to 10 carbon atoms in the acid molecule.

16. The method of claim 11 wherein the temperature range is between 250° and 300° C.

* * * * *